Figure 1:
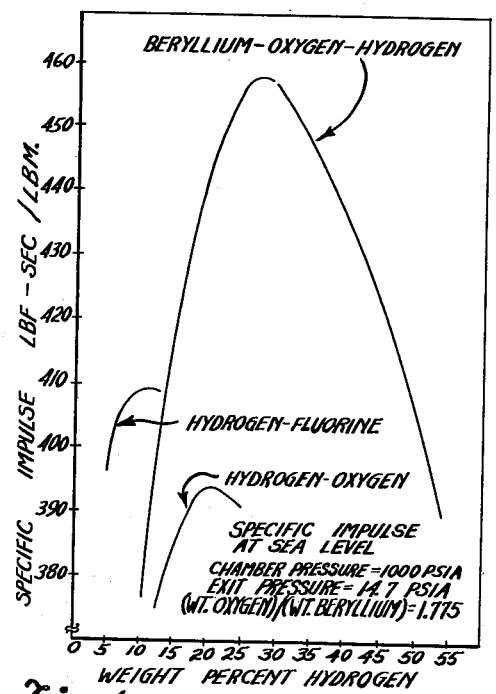

Dec. 3, 1963  R. M. BRIDGFORTH, JR  3,112,609
TRIPLEX PROPULSION SYSTEM AND METHOD HAVING THERMAL
RADIATION SUPPRESSION ASPECTS
Filed Dec. 12, 1960

INVENTOR.
ROBERT M. BRIDGFORTH, JR.

BY Mathis and Graybeal

ATTORNEYS

United States Patent Office 3,112,609
Patented Dec. 3, 1963

3,112,609
TRIPLEX PROPULSION SYSTEM AND METHOD HAVING THERMAL RADIATION SUPPRESSION ASPECTS
Robert M. Bridgforth, Jr., Mercer Island, Wash., assignor to Rocket Research Corp., Seattle, Wash., a corporation of Washington
Filed Dec. 12, 1960, Ser. No. 75,240
12 Claims. (Cl. 60—35.4)

This invention relates to a propulsion system for reaction thrust propelled vehicles such as rockets and, more specifically, to an ultra high energy propulsion system and process characterized by a fuel-oxidizer reaction which autogenously produces a principally non-gaseous reaction product and the admixture with the reaction product of a low molecular weight gas to serve as a working fluid in converting the thermal energy of the fuel-oxidizer reaction into kinetic energy. In particular, an embodiment of such a system can employ a beryllium or beryllium containing fuel component, oxygen as the oxidizing component, and hydrogen as the working fluid, which constituents provide what may be termed a triplex propellant. In certain aspects, this invention also provides a readily controllable propellant system of a type capable of delivering efficient reaction thrust without evidencing substantial thermal radiation from the reaction exhaust products, thereby greatly increasing the immunity of the system as to detection by thermally sensitive searching and homing devices, it being of course known that conventional high energy propulsion systems are very susceptible in this regard.

The unit of measure of the power of a propellant reaction is the specific impulse, defined as the thrust of the rocket engine divided by the flow rate of the propellant. Until the present time, it has been the opinion of those concerned with rocket propellants that the system hydrogen-fluorine gives the highest specific impulse of any stable chemical rocket propellant. The system of this invention provides a stable chemical rocket propellant with specific impulse substantially greater than that of the hydrogen-fluorine system.

Previously, in the selection of rocket propellants, attention has been directed toward those substances which, when reacted together, produce high temperature exhaust gases. These gases, the reaction products of the fuel and the oxidizer, are then expanded through a nozzle to leave the rocket at high velocity and exert a thrust upon the rocket.

In my invention the functions of producing heat and of converting thermal energy to kinetic energy are considered separately. Two classes of chemicals are used. One class is called the reactants, and these chemicals involve a fuel-oxidizer pair which react together to autogenously give a principally non-gaseous, i.e. liquid and/or solid, phase. As will be understood, an autogenously non-gaseous reaction product is one which has a principally non-gaseous phase when generated by the chemical reaction of the fuel-oxidizer pair under the reaction conditions pertaining in a rocket engine of conventional design. The reactants are selected primarily for their ability to produce large quantities of heat per unit mass. For purposes of the present invention, beryllium has been found to be the best fuel component and oxygen the best oxidizer component. The second class of system constituents is called the working fluid, and is selected primarily for the ability to receive the heat produced by the reactants and to convert this thermal energy into kinetic energy. For purposes of the present invention, hydrogen has been found to be the most effective working fluid.

In particular, the reaction system of the present invention comprises a triplex system involving beryllium-oxygen-hydrogen, which components in their intermixture, chemical reaction, and thermal interaction as a rocket propellant in a rocket engine produce a higher specific impulse than a beryllium-oxygen system, a hydrogen-oxygen system, or a hydrogen-fluorine system.

In its broader aspects, the present invention comprehends utilization of an essentially non-reacted, very low molecular weight gaseous working fluid with a reaction product which is principally in a non-gaseous phase even in the absence of a working fluid.

When beryllium reacts with oxygen, beryllium oxide is formed. The standard heat of reaction of beryllium with oxygen is the highest of any fuel-oxidizer pair of elements, being 10,300 B.t.u./lb. at 298° K. if the beryllium oxide is in the solid state and 9,850 B.t.u./lb. if the beryllium oxide is in the liquid state. If, however, consideration is given to the hypothetical reaction of beryllium and oxygen at 298° K. to produce beryllium oxide in the gaseous state, then a quite different situation pertains. Instead of large quantities of heat being evolved, heat is actually absorbed. However, beryllium oxide is in actuality a very non-volatile substance, and it must be heated to about 4,000° K. in order to develop a vapor pressure of 1 atmosphere. When beryllium reacts with oxygen in stoichiometric proportions at 1000 p.s.i.a., the majority of the reaction product is present in the liquid phase, with only a small percentage of gas, largely atomic oxygen and atomic beryllium, being present. Now, the prime requisite for an effective rocket propellant is that it can produce hot gases, which can expand from high pressure to low pressure, producing high velocity gases. Therefore, in spite of the very high heat of reaction of beryllium with oxygen, the beryllium-oxygen system is a very low performance rocket propellant because of the absence of the necessary amount of gases. The specific impulse of this system, under the conditions defined with respect to accompanying FIGURE 1, with a stoichiometric ratio of oxygen to beryllium, is only 244 lb. f.-sec./lb. m. Thermodynamic characteristics of this system are shown in the following Table I.

Table I

[The beryllium=oxygen propellant system—(wt. oxygen)/(wt. beryllium)=1.775. Sea level specific impulse=244 lb. f.=sec./lb. m.]

| | Reaction Chamber | Exhaust Plane |
|---|---|---|
| Pressure, p.s.i.a. | 1,000 | 14.7 |
| Temperature, ° K. | 5,730 | 4,140 |
| Chemical Composition, Wt. Percent: | | |
| Beryllium Oxide Liquid | 77.1 | 74.8 |
| Beryllium Oxide Gas | 5.0 | 4.1 |
| Beryllium Gas | 6.5 | 7.6 |
| Diatomic Oxygen Gas | 1.9 | 2.2 |
| Monatomic Oxygen Gas | 9.5 | 11.3 |

Now, when hydrogen is added to the beryllium-oxygen system, sufficient quantities of gas become available so that the expansion process produces high velocities. There is very little chemical reaction between the hydrogen and the reaction products, and the chemical species present after the reaction has taken place consist principally of beryllium oxide in principally non-gaseous phase and hydrogen in gaseous phase. The very large negative enthalpy of formation of beryllium oxide, coupled with the low molecular weight of hydrogen, results in a system having a very high specific impulse.

The mode by which the propulsion sysetm of this invention operates can be explained by referring to the basic principles of mechanics and thermodynamics that describe the flow of gases and determine the magnitude of the specific impulse.

By definition, $$I_s = \frac{F}{\dot{m}} \quad (I)$$

where $I_s$ = specific impulse, lb. f.-sec./lb. m.
$F$ = thrust of rocket engine, lb. f.
$\dot{m}$ = mass flow rate of propellant, lb. m./sec.

From Newton's law of motion, we have, $$F = \frac{\dot{m} V e}{g} + Ae(Pe - Po) \quad (II)$$

where $Ve$ = velocity of exhaust products, with respect to the rocket engine, ft./sec.
$g$ = unit conversion factor = 32.2 lb. m./slug
$Ae$ = cross sectional area of rocket nozzle at exhaust plane, ft.$^2$
$Pe$ = pressure of exhaust gases at exhaust plane, lb. f./ft.$^2$
$Po$ = ambient pressure, lb. f./ft.$^2$ The law of conservation of energy requires that $$Ve = \sqrt{2gJ(hc - he)} \quad (III)$$

where $J$ = unit conversion factor, 778 ft.-lb. f./B.t.u.
$hc$ = enthalpy in reaction chamber, B.t.u./lb. m.; and
$he$ = enthalpy at exhaust plane, B.t.u./lb. m.

The specific impulse can be found from the above equations in the following manner:

(1) *hc is determined.*—From knowledge of the propellant constituents and their pre-reaction states, the enthalpy of the propellants before reaction is obtained. Since the reaction process in the reaction chamber is adiabatic (i.e. without external heat input) and at constant pressure, there is no change in enthalpy and the enthalpy of propellants before reaction equals $hc$.

(2) *Tc is determined.*—From the equilibrium constants for the chemical reactions which can occur in the reaction chamber, the chemical composition and temperature in the chamber are determined, consistent with the conditions that the enthalpy equals $hc$ as determined under (1) and that the pressure equals $Pc$, the chamber pressure.

(3) *Sc is determined.*—From a knowledge of $Tc$, $Pc$, and the chemical composition, $Sc$, the entropy per unit mass in the reaction chamber is determined.

(4) *Te is determined.*—Since flow in the nozzle is approximately isentropic, $Se$, the entropy per unit mass at the exhaust plane, equals $Sc$. From the equilibrium constants for the chemical reactions which can occur in the nozzle, the chemical composition and temperature at the exhaust plane are determined, consistent with the conditions that the entropy equals $Se$ as determined above and that the pressure equals $Pe$, the pressure of the exhaust gas at the exhaust plane.

(5) *he is determined.*—From a knowledge of $Te$ and the chemical compositions at the exhaust plane, $he$ is determined.

(6) *$I_s$ is determined.*—From Equation III, $Ve$ is determined. From Equations I and II, $I_s$ is determined.

An insight into the various factors which are at work in the beryllium-oxygen-hydrogen system can now be obtained by the following considerations:

For an isentropic expansion process, the first and second laws of thermodynamics require that $$dh = \frac{dP}{\rho J} \quad (IV)$$

where $dh$ = infinitesimal change in enthalpy per unit mass, B.t.u./lb. m.;
$dP$ = infinitesimal change in pressure, lb. f./ft.$^2$; and
$\rho$ = density, lb. m./ft.$^3$.

Now, approximately, $$\rho = \beta \rho G$$

where $$\beta = \frac{\text{total mass flow rate of propellant}}{\text{mass flow rate of gas phase}}$$

and $\rho G$ = density of gas, lb.m./ft.$^3$

From Equations I, II, III, and IV, letting $Pe = Po$, (assuming the ideal gas law) and assuming thermal and kinetic equilibrium between gas phase and condensed phase, we have $$(I_s)_{Pe=Po} = \sqrt{\frac{2R'}{g}} \sqrt{\int_{Pe}^{Pc} \frac{T dP}{\beta M P}} \quad (V)$$

where $R'$ = universal gas constant = 1544 ft.-lb. f./(lb. m.-mole)-° R.;
$T$ = temperature, ° R.; and
$M$ = molecular weight of gas phase, lb. m./(lb. m.-mole).

From Equation V, it is evident that for high specific impulse, $T$ should be high, but $\beta$ and $M$ should be low. With the beryllium-oxygen system, the reaction products are largely condensed, with little gas being formed; hence $\beta$ is high, and $I_s$ is low.

For the purpose of obtaining still more detailed insight into the interactions of the various effects, further assumptions will now be made, leading to approximate equations for specific impulse. Assuming that chemical composition is frozen at chamber conditions, and that specific heat is independent of temperature, we obtain $$(I_s)_{Pe=Po} = \sqrt{\frac{2J}{g} C_p T_c \left[1 - \left(\frac{Pe}{Pc}\right)^{R'/J\beta C_p M}\right]} \quad (VI)$$

where $C_p$ = specific heat, B.t.u./lb.m.—° R.

Since $$C_p T_c = C_p T_o + (1-Z) Q_c$$

where $To$ = temperature of reactants and working fluid before reaction in ° R.;

$$Z = \frac{\text{mass flow rate of working fluid added to reactants}}{\text{total mass flow rate through rocket}}$$

and $Q_c$ = heat of reaction of reactants, B.t.u. per lb. m. of reactants, without considering the working fluid. This is the heat that would be evolved if 1 lb. m. of reactant were reacted at constant temperature, $To$, and constant pressure, $Pc$, to form the chemical composition which would actually obtain under adiabatic reaction conditions.

And, since $To$ is much less than $Tc$, Equation VI becomes $$(I_s)_{Pe=Po} \cong \sqrt{\frac{2J}{g}(1-Z) Q_c \left[1 - \left(\frac{Pe}{Pc}\right)^{R'/J\beta C_p M}\right]} \quad (VII)$$

By examining the above equation, the effects of adding hydrogen as a working fluid to a stoichiometric beryllium-oxygen reactant system can be seen. As the hydrogen content increases, the following effects occur, considering each term separately:

(1) $(1-Z)$—The factor $(1-Z)$ decreases, representing a dilution of the heat source. This tends to decrease the specific impulse.

(2) $Q_c$—With no hydrogen, the majority of the reaction product consists of liquid beryllium oxide, but there also exist small percentages of atomic oxygen gas and atomic beryllium gas, and still smaller percentages of beryllium oxide gas and diatomic oxygen gas. When hydrogen is added, the beryllium gas and oxygen gas combine and condense to form more liquid beryllium oxide. With still more hydrogen, the beryllium oxide freezes, and eventually essentially all of the beryllium and oxygen in the system are combined in the form of solid beryllium oxide. This results in increase of the factor $Q_c$, which tends to increase $I_s$.

(3) $\beta$—As hydrogen is added, the beryllium gas and oxygen gas combine and condense, increasing $\beta$. Soon, however, essentially all of the beryllium and oxygen are condensed, and addition of more hydrogen causes $\beta$ to decrease. A decrease in $\beta$ causes $(R'/J\beta C_p M)$ to increase, and since $(Pe/Pc)$ is less than 1, $$\left(\frac{Pe}{Pc}\right)^{R'/J\beta C_p M}$$

becomes less, and hence $$\left[1-\left(\frac{Pe}{Pc}\right)^{R'/J\beta C_p M}\right]$$

becomes greater, tending to increase $I_s$. Therefore, as hydrogen is added, the effect, through the factor $\beta$, is first to tend to decrease $I_s$ and then to tend to increase $I_s$ with still further addition of hydrogen.

(4) $C_p$—The specific heat of hydrogen per unit mass is greater than that of the other substances present. Therefore, as hydrogen is added, the mean specific heat per unit mass increases, tending to decrease specific impulse.

(5) M—When no hydrogen is present, the gas phase consists principally of beryllium gas and atomic oxygen gas, with smaller proportions of beryllium oxide gas and diatomic oxygen gas, giving a mean molecular weight of approximately 15. When hydrogen is added, the other gases condense, leaving a gas phase composed almost entirely of hydrogen, having a molecular weight of approximately 2. This decrease in M tends to increase $I_s$.

The composite result of all these effects is that as hydrogen is added to beryllium-oxygen, the specific impulse first increases, and then decreases when the hydrogen content is increased above about 27% by weight in the total mixture.

The specific impulse values of the system beryllium-oxygen-hydrogen are shown in the following Table II, defining the performance of the propellant at sea level, and in the following Tables III and IV, defining the performance of the propellant in the environment of outer space:

Table II

[Specific impulse at sea level—Beryllium-oxygen-hydrogen. Chamber pressure=1000 p.s.i.a.; exit pressure=14.7 p.s.i.a.]

| (Wt. Oxygen)/(Wt. Beryllium) | Wt. Percent Hydrogen | Specific Impulse, lb. f.-sec./lb. m. |
|---|---|---|
| 1.775 | 0 | 244 |
| 1.775 | 5 | 328 |
| 1.775 | 10 | 378 |
| 1.775 | 15 | 416 |
| 1.775 | 20 | 443 |
| 1.775 | 25 | 456 |
| 1.775 | 26 | 457 |
| 1.775 | 27 | 457 |
| 1.775 | 28 | 457 |
| 1.775 | 29 | 456 |
| 1.775 | 30 | 455 |
| 1.775 | 35 | 447 |
| 1.775 | 40 | 436 |
| 1.775 | 45 | 422 |
| 1.775 | 50 | 406 |
| 1.775 | 55 | 387 |
| 1.000 | 0 | 256 |
| 1.000 | 30 | 399 |
| 1.000 | 50 | 358 |
| 1.000 | 55 | 340 |
| 30.000 | 0 | 162 |
| 30.000 | 20 | 405 |
| 30.000 | 50 | 332 |
| 30.000 | 55 | 316 |

Table III

[Specific impulse in vacuum—Beryllium-oxygen-hydrogen. Chamber pressure=1000 p.s.i.a., (wt. oxygen)/(wt. beryllium)=1.775; exhaust nozzle area ratio=50]

| Wt. Percent Hydrogen | Specific Impulse, lb.f.-sec./lb. m. |
|---|---|
| 0 | 303 |
| 10 | 467 |
| 20 | 536 |
| 21 | 538 |
| 22 | 538 |
| 23 | 541 |
| 24 | 541 |
| 25 | 542 |
| 27 | 543 |
| 29 | 541 |
| 40 | 538 |
| 50 | 512 |
| 55 | 472 |
| | 447 |

Table IV

[Specific impulse in vacuum—Beryllium-oxygen-hydrogen. Chamber pressure=1000 p.s.i.a.; (wt. oxygen)/(wt. beryllium)=1.775. Hydrogen concentration selected for maximum specific impulse]

| Exhaust Nozzle Area Ratio | Specific Impulse, lb.f.-sec./lb.m. |
|---|---|
| 20 | 519 |
| 50 | 543 |
| 100 | 554 |
| 500 | 580 |
| ∞ | 703 |

The following Table V shows the gains in specific impulse which the beryllium-oxygen-hydrogen system produces over the hydrogen-oxygen system and the hydrogen-fluorine system.

Table V

[Beryllium-oxygen-hydrogen—Chamber pressure=1000 p.s.i.a. Propellant compositions selected for maximum specific impulse. Specific impulse differences expressed in lb. f.-sec./lb. m.]

| Condition | Increase in Specific Impulse over Hydrogen-oxygen | Increase in Specific Impulse over Hydrogen-Fluorine |
|---|---|---|
| Sea level; exit pressure=14.7 p.s.i.a. | 63 | 48 |
| Vacuum; Nozzle Area Ratio=50 | 82 | 63 |
| Vacuum; Nozzle Area Ratio=100 | 82 | 65 |
| Vacuum; Nozzle Area Ratio=500 | 92 | 74 |
| Vacuum; Nozzle Area Ratio=∞ | 133 | 166 |

The maximum sea level specific impulse is obtained with the following composition:

Wt. percent hydrogen=27
(Wt. oxygen)/(wt. beryllium)=1.78

As shown in Table II, this propellant composition gives a sea level specific impulse of 457 lb. f.-sec./lb. m., which is 48 lb. f.-sec./lb. m. greater than that of hydrogen-fluorine, the combination formerly though to be the most powerful stable chemical propellant, which has under the same conditions a specific impulse of 409 lb. f.-sec./lb. m. It is also to be noted that the sea level specific impulse of the beryllium-oxygen-hydrogen system is 63 lb. f.-sec./lb. m. greater than that of the system hydrogen-oxygen, a currently popular high energy propellant which has under the same conditions a specific impulse of 394 lb. f.-sec./lb. m. With large area ratio exhaust nozzles, the gains in vacuum specific impulse over conventional systems become greater, approaching up to 133 lb. f.-sec./lb. m. improvement over hydrogen-oxygen and approaching up to 166 lb. f.-sec./lb. m. improvement over hydrogen-fluorine as the exhaust nozzle area ratio becomes indefinitely larger. As the exhaust nozzle area ratio becomes larger, the composition which produces maximum vacuum specific impulse corresponds to a stoichiometric ratio of oxygen to beryllium, (wt. oxygen)/(wt. beryllium)=1.775, but the concentration of hydrogen for maximum vacuum specific impulse varies from a weight percent of about 25 at a nozzle area ratio of 50 to a weight percent of about 20 at a nozzle area of 1000, and approaches a weight percent of zero as the nozzle area ratio approaches infinity.

Figure 2:
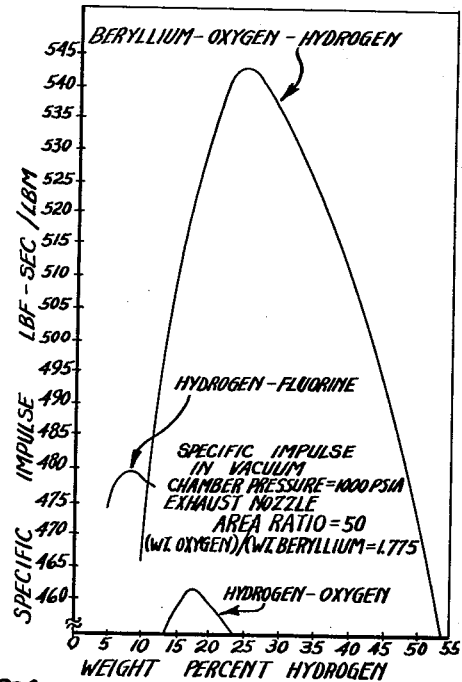
Figure 3:
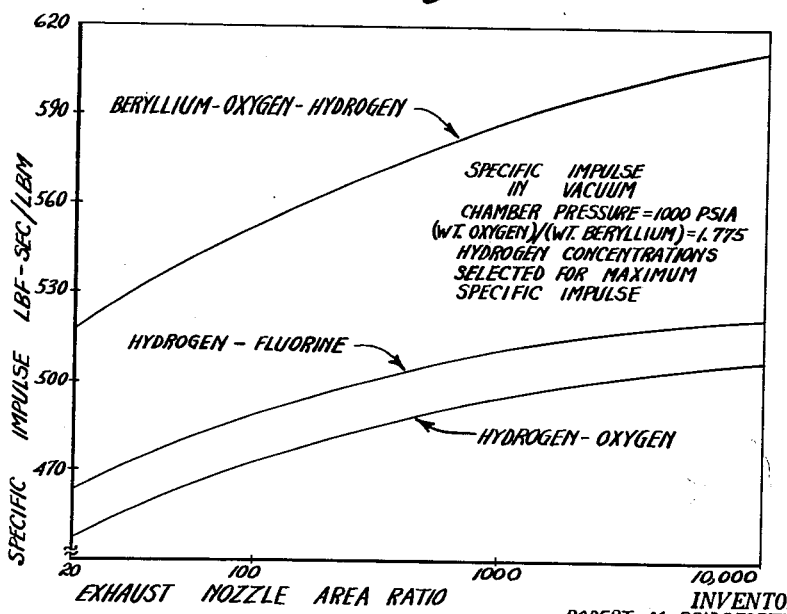

For purposes of ready comparison, and to show the substantially improved performance characteristics of the triplex propellant system here presented, accompanying FIG. 1 graphically shows the variations of sea level specific impulse of hydrogen-fluorine and hydrogen-oxygen systems, as well as that of the beryllium-oxygen-hydrogen system of the present invention, assuming a reaction chamber pressure of 1000 p.s.i.a. and an exit pressure of 14.7 p.s.i.a.; FIG. 2 shows a corresponding comparision of the vacuum specific impulse values of the three systems under a typical exhaust nozzle area ratio of 50; and FIG. 3 similarly compares the maximum vacuum specific impulses of the three systems at various exhaust nozzle area ratios.

It is seen from the above tabulated and graphical data that, in the beryllium-oxygen-hydrogen propellant system, the relative proportions of the system components are relatively critical for optimum performance and that only combinations within certain ranges are capable of producing specific impulse values which are sufficiently great to represent a significant improvement over previous propellant systems.

When the hydrogen content is below about 10% by weight, the system, although having a specific impulse above that of hydrogen-oxygen at the same hydrogen concentration, has a specific impulse significantly below that possible with hydrogen-oxygen at higher hydrogen concentrations. When the hydrogen content is raised above about 55% by weight, the over-all propellant density becomes relatively low, requiring heavy tankage, and because of the large diluting effect of the hydrogen, the specific impulse decreases below that of a hydrogen-oxygen system. Accordingly, the hydrogen content should preferably be between about 20% and about 40% by weight, for maximum performance, with about 10% as the lower limit of interest and about 55% as the upper limit of interest.

For stoichiometric reaction between beryllium and oxygen to form beryllium oxide, the ratio (wt. oxygen)/(wt. beryllium) should be about 1.78. When excess beryllium is added to the system, the oxygen to beryllium ratio falls below 1.78. With very low hydrogen content, the beryllium vaporizes and acts as a working fluid, reducing $\beta$ and increasing specific impulse. At larger concentrations of hydrogen, the principal effect of an excess of beryllium is the absorption of heat in vaporization, reducing the specific impulse. At still larger hydrogen concentrations, the beryllium does not vaporize, but reduces specific impulse due to its effect in diluting the heat source.

The addition of excess oxygen, above the stoichiometric ratio, produces appreciable quantities of water in the gas phase, reducing the weight percent of condensed phase but reducing the over-all heat of reaction per pound of propellant. With a very large oxygen content, the system approaches the hydrogen-oxygen system, and the presence of small amounts of beryllium in the propellant is unjustified because the comparatively small gain in performance would not normally justify the consequent increase in complexity required to introduce a third component. Therefore, the ratio (wt. oxygen)/(wt. beryllium) should usually be near stoichiometric, i.e. about 1.78, and the entire range of interest for this ratio extends from about 1.00 to about 30.0.

With respect to the above considerations as to specific propellant formulations, it is of course to be kept in mind that an optimum propellant constituency in a given situation will depend upon the specific mission which the rocket system is to perform, and does not always exactly correspond to the composition giving maximum specific impulse. Tank weights must be considered, in a study of the particular mission and the propellant requirements. For some missions, a composition which has a greater over-all propellant density may have lower tank weights and may give better over-all vehicle performance than given by the exact constituency having maximum specific impulse. The optimum propellant composition, with the optimum compromise between high specific impulse and high propellant density, therefore depends upon the specific mission and utilization environment.

This propellant system is utilizable in a rocket engine by techniques generally known per se in rocket technology. Storage chambers are provided for the propellants, which are suitably transported from the storage chambers to the reaction chamber. Here, mixing and chemical reaction take place, the beryllium reacting with the oxygen and releasing large quantities of heat. The hydrogen mixes with the beryllium oxide, receives its heat, and expands through a converging-diverging nozzle, carrying along the solid and/or liquid beryllium oxide, and leaving the rocket at high velocity, exerting a thrust on the rocket.

The hydrogen and the oxygen can be carried in propellant tanks as liquids, using the technology of handling cryogenic fluids which is now well developed in the rocket industry. The beryllium can be carried in storage tanks and introduced into the reaction chamber in the form of small pellets or powder, or in the form of wire, bar, paste or slurry with a suitable liquid vehicle such as a hydrocarbon present in minor proportion, which preferably can nominally also react in the fuel-oxidizer reaction. Alternately, the beryllium can be carried directly in the reaction chamber in suitable solid form, such as a chamber liner, and can constituently be either substantially pure or contain relatively small quantities of beryllium hydride or ammonium perchlorate, for example.

The beryllium, oxygen, and hydrogen preferably are injected, exposed, or otherwise introduced to the reaction chamber at essentially uniform rates and in such a manner as to obtain rapid intermixing of all three. A modification of this method of injection consists in designing the injector so that the beryllium and oxygen are mixed first, and the resulting beryllium oxide is then mixed with hydrogen, which has been injected around the walls at the primary injector or which has been injected downstream of the primary injector station.

In another utilization layout for the system, a portion of the hydrogen is carried in the form of beryllium hydride by having a portion or all of the beryllium in the form of beryllium hydride. In the following Tables VI and VII, it is seen that the specific impulse of the beryllium hydride-oxygen-hydrogen system is not quite as great as the beryllium-oxygen-hydrogen system. However, the over-all density of the propellants is increased and under some circumstances it can be practically desirable to employ an essentially beryllium hydride, oxygen, and hydrogen system.

*Table VI*

[Specific Impulse at Sea Level—Beryllium Hydride-Oxygen-Hydrogen. Chamber Pressure=1000 p.s.i.a.; Exit Pressure=14.7 p.s.i.a. (Wt. Oxygen)/(Wt. Beryllium)=1.775]

| Wt. Percent Uncombined Hydrogen | Specific impulse, lb. f.-sec./lb. m. |
|---|---|
| 0 | 340 |
| 2.8 | 360 |
| 8.0 | 397 |
| 10.0 | 407 |
| 13.6 | 422 |
| 19.0 | 435 |
| 24.4 | 432 |
| 35.0 | 415 |
| 40.0 | 403 |
| 45.0 | 388 |

It is seen that high specific impulse is obtained with the above system when the weight percent of combined hydrogen lies between about 10 and about 40.

Table VII

[Specific Impulse in Vacuum—Beryllium Hydride-Oxygen-Hydrogen. Chamber Pressure=1000 p.s.i.a. (Wt. Oxygen)/(Wt. Beryllium)=1.778. Hydrogen Concentration Selected for Maximum Specific Impulse]

| Exhaust Nozzle Area Ratio | Specific Impulse, lb. f.-sec./lb. m. |
|---|---|
| 50 | 516 |
| 100 | 530 |
| ∞ | 646 |

In the following Table VIII there is presented data with respect to the temperature in the reaction chamber for the three systems hydrogen-fluorine, hydrogen-oxygen, and beryllium-oxygen-hydrogen. From construction and material-usage standpoints, the lower the temperature of combustion, the longer the life of the materials of construction and, also, the lighter the weight of the materials of construction that can be used. Therefore, it can be seen that the beryllium-oxygen-hydrogen system is superior to the other two systems in Table VIII from these viewpoints.

Table VIII

[Chamber temperature—Chamber pressure=1000 p.s.i.a.; Exit pressure =14.7 p.s.i.a. Concentrations selected for maximum specific impulse]

| Propellant | Temperature in Reaction Chamber, °F. |
|---|---|
| Hydrogen-Fluorine | 6,500 |
| Hydrogen-Oxygen | 4,930 |
| Beryllium-Oxygen-Hydrogen | 4,620 |

A potential method of detecting the launching of missiles is by the use of instruments which respond to the radiations emitted by the hot exhaust gases from the rocket. The energy which is radiated by hot bodies is given by the equation:

$$\phi = \epsilon \sigma T^4$$

where $\phi$ = energy per unit area per unit time;
$\epsilon$ = emissivity, a function of temperature, pressure, and geometry;
$\sigma$ = Stephan-Boltzmann constant; and
$T$ = absolute temperature.

For a specific gas, the above equation can be approximated by an equation of the following type:

$$\phi = kf(P)GT^m$$

where $k$ = constant;
$f(P)$ = a function of the partial pressure of the gas;
$G$ = a constant depending on the geometry of the radiating gas; and
$m$ = a constant, depending on the nature of the gas; typically being between 3 and 4.

Since the exponent of the temperature of the above equations is so high, it is evident that a decrease in the temperature of the radiating gases brings about a very great decrease in the radiant energy which is emitted. Thus, a decrease in the temperature of a factor of 3 will reduce the radiated energy to about 1% of its previous value. It is evident, that with sufficiently cool exhaust gases, the energy radiated by the rocket will become so low that it will be difficult to detect, and, eventually, as the temperature is lowered (as by adding more hydrogen, for example), the radiation from the rocket becomes the same as from the ambient background, and the rocket gases become essentially invisible to infrared detection systems.

For certain applications, it can be desirable to utilize a propellant having high specific impulse but which provides exhaust products having very low temperatures. If the temperature of the exhaust products is only slightly above ambient temperature, equal to ambient temperature, or slightly below ambient temperature, the infrared radiation emitted by the exhaust products is decreased to the point where detection and tracking of a vehicle launching and flight by means of infrared sensors becomes difficult or impossible. For example, a ballistic missile can be launched with all stages employing cool reaction products; or, alternately, the final upper stage only could utilize cool propellants in applying the final or "burn out" velocity of the missile. In this way, the missile can be rendered substantially invisible to an infrared or like thermally responsive detection system. It is an important facet of this invention that the thermal radiation level is readily controllable simply by regulation of the proportion of working fluid mixed with the reaction products. Manifestly, any sequence of regulation can be employed and automatically effected to gain optimum performance (highest specific impulse) or optimum thermal invisibility as desired during flight progress, depending upon specific mission requirements. As a further ramification of the control of the thermal invisibility of a reaction propelled vehicle, it will be recognized by those skilled in the art that the proportion of working fluid delivered to the reaction can be responsively and automatically controlled by means continuously sensing the temperature condition of the ambient environment.

The following Table IX gives two examples of temperatures produced by the beryllium-oxygen-hydrogen system:

Table IX

[Exhaust temperature—Beryllium-oxygen-hydrogen (wt. O/wt. Be=1.775); chamber pressure=1000 p.s.i.a.]

| Wt. Percent Hydrogen | Chamber Temperature, °F. | Exhaust Temperature, Pe=14.7 p.s.i.a., °F. | Exhaust Temperature, Exhaust Nozzle Area Ratio=50, °F. |
|---|---|---|---|
| 50 | 2,140 | 460 | 7 |
| 55 | 1,740 | 290 | −101 |

With conventional propellants, the variation of the mixture ratio to produce very low temperature exhaust products will also produce very low specific impulse, and hence is undesirable from the standpoint of overall performance. However, the beryllium-oxygen-hydrogen system can provide high specific impulse at a very low temperature, and the temperature can be readily controlled by varying the percent of hydrogen, as above indicated.

The striking capability of a propulsion system involving an essentially unreacted, very low molecular weight working fluid with the exhaust products at about ambient temperature, yet nevertheless obtaining high specific impulse is demonstrated by an inspection of Table IX along with accompanying FIGS. 1 and 2. When the proportion of the hydrogen constituent is about 50–55%, as shown at FIGS. 1 and 2, the specific impulse of the system is still directly comparable to the highest obtainable in hydrogen-fluorine or hydrogen-oxygen propellant systems, even though the order of exhaust product temperatures is about ambient (Table IX).

It is a further characteristic of this invention, of fundamental importance insofar as concerns providing high specific impulse and substantial thermal invisibility, that the cooling effect of the very low molecular weight working fluid can be utilized in various other types of propellant systems and is by no means limited to the specific beryllium-oxygen-hydrogen system here disclosed. For example, similar thermal invisibility is within the capability of the lithium-fluorine-hydrogen system disclosed in my copending application Serial No. 67,017, filed November 3, 1960, and entitled "Triplex Propulsion System and Method," it being of interest also as to the application of this thermal invisibility concept to a lithium-fluorine-hydrogen system that its reaction products can be characterized as of a type having an autogenously gaseous phase and that the cooling effect of the hydrogen in that environment is also not inconsistent with high specific impulse. Other propellant systems wherein a very low molecular weight working fluid can be proportioned to give substantial thermal invisibility, such as boron (or boron hydride)-fluorine-hydrogen, and boron (or boron hydride)-oxygen-hydrogen systems. Yet other systems of like functionality in this respect will occur to those skilled in the art to which the invention is addressed.

The specific impulse values reported in this specification apply to the case of isentropic and equilibrium flow and are based upon the propellants in the following initial states: liquid para hydrogen at its normal boiling point of 20° K.; liquid oxygen at its normal boiling point of 90° K.; solid beryllium at 298° K.; and solid beryllium hydride at 298° K.

The above principles with respect to utilization of a very low molecular weight working fluid to improve thermal invisibility can also be applicable to other reaction engines such as ramjets and turbojet-afterburner combinations to momentarily decrease exhaust temperatures and hence decrease infrared radiation when needed, as when a craft is under attack by a thermally homing intercept missile. For example, hydrogen from a standby source can be injected on an emergency basis at the afterburner stage of a turbojet engine to cool the reaction and reduce exhaust temperature.

From the foregoing specification it is seen that there is present a beryllium-oxygen-hydrogen rocket propulsion system, which triplex system is characterized essentially by a chemical reaction between a beryllium containing constituent and oxygen, producing an essentially beryllium oxide reaction product which is autogenously in principally non-gaseous phase, and with the hydrogen acting as a low molecular weight expansion gas, i.e. working fluid, functioning to efficiently convert the thermal energy available from the non-gaseous phase reaction product into kinetic energy, producing a high specific impulse. It is also seen that certain aspects of the invention realize significant reduction in relative infrared radiation, and that such aspects of the invention are of broader application than the specific propulsion systems here disclosed.

From the foregoing considerations, various further modifications, formulations, and utilization techniques characteristic of the invention will be apparent to those skilled in the art, within the scope of the following claims.

What is claimed is:

1. The method of generating high specific impulse in a reaction engine having beryllium oxide reaction chamber and a discharge nozzle and utilizing a fuel-oxidizer reaction producing a reaction product which is essentially beryllium oxide; said method comprising mixing essentially unreacted hydrogen with said beryllium oxide reaction product in said chamber in sufficent amount to materially increase specific impulse by reducing average molecular weight and by converting a substantial part of the thermal energy of the chemical reaction into kinetic energy as the mixture discharges from said nozzle.

2. A high specific impulse propellant composition, comprising fuel and oxidizer reaction components forming a reaction product which is essentially beryllium oxide, such propellant composition further comprising essentially unreacted hydrogen admixed with such reaction product to convert a substantial portion of the heat of reaction into kinetic energy.

3. The propellant composition of claim 2, wherein said fuel component is selected from the group consisting of beryllium, beryllium hydride, and mixtures thereof.

4. The propellant composition of claim 2, wherein said oxidizer component is essentially oxygen.

5. The method of generating ultra high energy reaction propulsion comprising reacting a beryllium containing fuel component with oxygen, such reaction occurring in a reaction chamber having a high area ratio exhaust nozzle and occurring in the presence of essentially uncombined hydrogen, the propulsion producing mass having present therein autogenously reacted beryllium oxide, and also having present sufficient essentially uncombined hydrogen to constitute at least about ten percent by weight of the total weight of the propulsion producing mass.

6. A method of generating thrust in a rocket engine; said method comprising mixing beryllium, oxygen and uncombined hydrogen in a reaction chamber, and discharging the beryllium oxide reaction product and admixed hydrogen through an exhaust nozzle at high velocity, producing thrust; the weight ratio of oxygen to beryllium being between about 1 and about 30; and the weight percent of the uncombined hydrogen in the discharging mixture being between about 10 percent and about 55 percent.

7. A method of generating thrust in a rocket engine; said method comprising mixing beryllium, oxygen and uncombined hydrogen in a reaction chamber, and discharging the beryllium oxide reaction product and admixed hydrogen through an exhaust nozzle at high velocity, producing thrust; the weight ratio of oxygen to beryllium being approximately 1.78, and the weight percent of the uncombined hydrogen in the discharging mixture being between about 20 percent and about 40 percent.

8. A method for generating thrust in a rocket engine; said method comprising mixing beryllium hydride, beryllium, oxygen and uncombined hydrogen in a reaction chamber and discharging the beryllium oxide reaction product and admixed hydrogen through an exhaust nozzle at high velocity, producing thrust; the weight ratio of oxygen to total beryllium being approximately 1.78, and the weight percent of the uncombined hydrogen in the discharging mixture being between about 10 percent and about 40 percent.

9. The method of rocket propulsion comprising: exothermally reacting in a propulsion reaction chamber fuel and oxidizer components characterized by the formation of an at least primarily non-gaseous reaction product; and non-reactively admixing uncombined hydrogen with the reactant components in sufficient amount to produce high propulsion performance.

10. The method of rocket propulsion comprising: exothermally reacting in a propulsion reaction chamber fuel and oxidizer components characterized by the formation of a reaction product which is at least primarily non-gaseous; and non-reactively admixing uncombined hydrogen with the reactant components in sufficient amount to produce high propulsion performance with minimal thermal radiation from the rocket exhaust.

11. The method of rocket propulsion comprising: exothermically reacting in a propulsion reaction chamber fuel and oxidizer components generating a reaction product having a substantially higher heat per unit mass than is generated by stoichiometric reaction of oxygen and hydrogen; and non-reactively admixing uncombined hydrogen with such reaction product in sufficient amount to effectively cool the reaction product to about the temperature of the ambient environment as it exhausts from said reaction chamber, the cooled reaction product nevertheless providing high propulsion performance while exhausting from the reaction chamber.

12. The method of claim 11, further comprising sensing the temperature of the ambient environment, and regulating the proportion of hydrogen admixed with the reaction product in response to the temperature of the ambient environment.

References Cited in the file of this patent

UNITED STATES PATENTS

| | | |
|---|---|---|
| 2,811,431 | Zwicky et al. | Oct. 29, 1957 |
| 2,956,402 | Rae | Oct. 18, 1960 |
| 3,040,518 | Rae | June 26, 1962 |